July 30, 1968     B. B. GARRETT     3,394,952
SEWER PIPE JOINT
Filed May 3, 1965
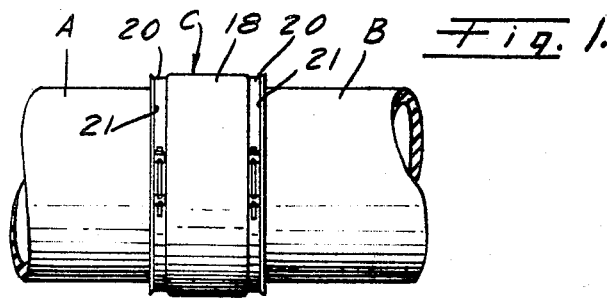
Fig. 1.
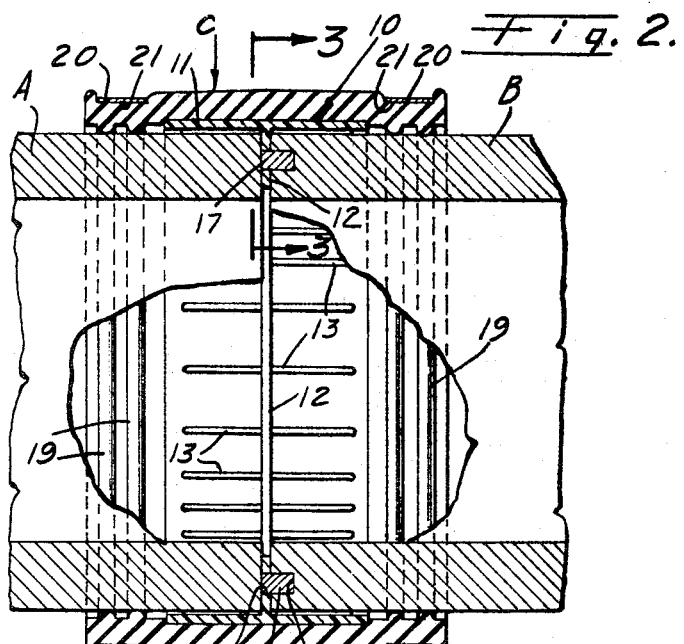
Fig. 2.
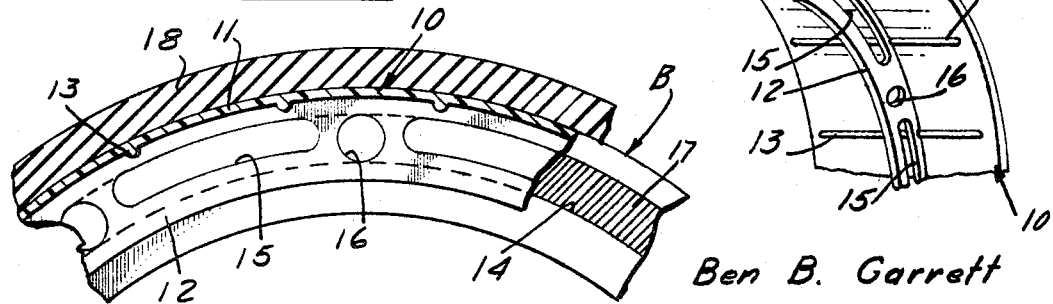
Fig. 3.
Fig. 4.
Ben B. Garrett
INVENTOR.
WHANN & McMANIGAL
Attorneys for Applicant
by Robert M. McManigal United States Patent Office 3,394,952
Patented July 30, 1968

3,394,952
SEWER PIPE JOINT
Ben B. Garrett, 932 E. Philadelphia St.,
Whittier, Calif. 90601
Filed May 3, 1965, Ser. No. 452,772
4 Claims. (Cl. 285—236)

ABSTRACT OF THE DISCLOSURE

Couplings for joining straight ended pipes, such as sewer pipes, in end-to-end relation, including a part which can be pre-assembled and connected with one end of a pipe section, this part having an inner tubular collar of semi-rigid material formed with an integral inner radial flange between its ends in which there are circumferentially spaced openings, the ends of the collar being arranged to receive pipe sections in end-to-end relation and having internal axially extending elongate projecting pads for engaging the outer surface of the pipe end therein, the collar being anchored to the end of one of the connected pipe sections by an epoxy bonding medium in a groove in the end edge of one of the pipe sections, such bonding medium extending into the flange openings so as to interlock the flange to the associated pipe section. Final coupling is completed by means of an outer rubber sleeve having end clamping bands positioned at the sleeve ends, and below which are formed internal circumferentially extending pipe surface engaging beads or ribs.

The present invention relates generally to means for coupling or joining the ends of pipes such as utilized for the conveying of sewage or other liquids, and especially pipes fabricated of ceramic materials and having straight connectable ends rather than the conventional bell and spigot ends.

Numerous attempts have been made to overcome the inherent disadvantages attending the use of conventional bell and spigot types of connections as commonly utilized for sewer pipes.

Heretofore structures have been proposed for joining sewer pipes having straight ends, but these known attempts have not been entirely satisfactory in solving the problems which arise as a result of the particular procedures utilized in laying sewer pipes, and the conditions which usually arise thereafter.

It should be understood that in the usual installation, the pipe line is laid in the bottom of a ditch and is supported more or less at irregular intervals where the line rests upon rocks or other material which is of harder character than the material normally comprising the ditch bottom, or the line may bridge high spots in the ditch bottom. Thus, after the ditch is filled, settling of certain areas may occur and leave the line suspended between spaced points of support. Distorting forces can thus be applied to the line which may cause leaks, breakage and other undesired conditions to appear, and which could eventually disrupt the services and necessitate costly repairs.

Two approaches have been made in an effort to solve the problem. In one, rigid joints of metal, cement and the like have been used, but these did not permit sufficient line flexing to enable the line to naturally accommodate to changing conditions due to settling and other causes. The other approach comprised an opposite concept and utilized a flexible connection. While such a connection provided the desired flexibility, it did not have sufficient rigidity to carry the weight of the pipe sections, nor did it operate in a manner to properly hold the connected pipe ends against eventually becoming offset.

In summary, the present invention relates generally to pipe couplings, and is more particularly concerned with improvements in pipe coupling structures for sewer pipes and the like, which provides sufficient rigidity to hold the pipe ends in alignment and yet which will have sufficient flexibility to accommodate to changing conditions after installation.

Briefly, the invention embodies an inner sleeve part of semi-rigid material, for interconnecting the adjacent ends of aligned pipe sections, and which may be pre-assembled and anchored to the end of one section to provide a composite pipe section structure adapted to receive the adjacent straight end of a connected section. A flexible outer sleeve of material such as rubber is mounted to encircle the joined pipe ends around the inner sleeve part, and is clamped at its ends to provide sealed connections with the adjacent pipe end surfaces.

With the foregoing in mind, the present invention has for one object the provision of a joint structure for sewer, and similar pipes, which combines both rigidity and flexibility in such a manner that the connected ends of the pipe sections will be retained in alignment, and yet will have the required flexibility to permit the line to accommodate to changing conditions without the connected ends becoming offset.

A further object is to provide a pipe connecting joint structure in which adjacent ends of the connected pipe sections are retained in alignment against offset by a member of semi-rigid material, while another member of relatively flexibile material is utilized for sealing the joint.

Still another object is to provide as a separate article of manufacture, a unique retaining collar structure for the connected pipe ends.

Further objects of the invention will be brought out in the following part of the specification, wherein detailed description is for the purpose of fully disclosing the invention without placing limitations thereon.

Referring to the accompanying drawings, which are for illustrative purposes only:

FIG. 1 is an elevational view of a coupling embodying the herein disclosed invention, the coupling being assembled on and interconnecting adjacent ends of pipe sections;

FIG. 2 is an enlarged vertical sectional view taken through the assembly shown in FIG. 1;

FIG. 3 is an enlarged fragmentary section taken substantially on line 3—3 of FIG. 2, and showing details of construction of certain associated parts of the invention; and FIG. 4 is a fragmentary perspective view showing details of construction of the inner connecting collar for the pipe ends.

Referring more specifically to the drawings, FIG. 1 illustrates generally pipe sections A and B which are joined in end-to-end relation by a pipe joint according to the present invention and as generally indicated at C. The pipes may be made of any of the conventional materials utilized for such purpose, such as clay, concrete, asbestos cement, or any of the other materials commonly used for sewer, drainage and similar pipes. The connected pipe ends, as shown in FIG. 2, differ from the usual conventional bell and spigot type as commonly used. In the present joint, it is contemplated that the pipe sections will have ends of uniform diameter and will thus present straight end portions to be connected by the joint construction of the present invention.

Referring further to FIG. 2, it will be noted that the pipe sections A and B are positioned with their connected ends in axial alignment. For retaining the adjacent ends of the pipe sections A and B in proper alignment, there is provided an inner collar element 10 which is constructed of a semi-rigid material which may be one of the well known plastics such as polypropylene or other suitable material. This collar includes a generally cylindrical body 11 which is internally divided by an integrally formed radially inwardly extending flange 12 which will extend between the adjacent ends of the pipe sections, when the pipe ends are inserted within the opposite ends of the body 11.

Since pipes of the character which are to be connected by the joint of the present invention may slightly vary as to diameter, or in some cases may even be slightly out of round, the opposite ends of the body 11 are provided with inwardly projecting pads 13 which in the present instance are shown as being in the form of axially extending ridges or ribs which are circumferentially spaced and extend from the flange 12 towards the adjacent end of the body 11. By providing pads of this character, the flexibility of the body 11 will permit slight deformation of its end portions when the ribs are in surface engagement with the adjacent outer surface of the associated pipe section. The pipe section ends are thus readily accommodated, yet will be held in axial alignment by the body 11.

In use, the inner collar element 10 is fixedly secured to one of the pipe section ends, and in this case is shown as being secured to pipe section B. This is accomplished by providing a circumferentially extending groove 14 in the end edge of the pipe section. Registering openings, such as indicated at 15 and 16 are provided along the length of the flange 12 so as to overlie the groove 14. The flange 12 is secured to the end edge of the section B by means of a bonding material 17 such as epoxy or the like which fills the groove 14 and extends into the openings 15 and 16 so as to interlock the parts in assembled relation. While the inner collar element is thus secured to the end of pipe section B, it will be observed that the associated end portion of pipe section A will be free to slightly pivot and work without becoming offset, and at the same time the connected ends of the pipe sections will be held in registration and axial alignment.

As thus arranged, it will be appreciated that the utilization of an inner collar element in the manner explained above does not in itself provide a sealed pipe joint. Accordingly the present invention provides an outer collar 18 which is in the form of a surrounding sleeve having sufficient length to overlie the inner collar element and have its ends extend beyond the ends of the inner collar element. This sleeve is fabricated from a suitable flexible material such as rubber or the like, and at each end is provided with one or more inwardly projecting circumferentially extending ribs 19 which are adapted to make surface engagement with the adjacent outer surface of the associated pipe section in an area outwardly positioned of the adjacent end of the inner collar element. Sealing engagement of the ends of the outer collar is obtained by means of band clamping elements 20—20 which are positioned in outer circumferentially extending end grooves 21—21.

Various modifications may suggest themselves to those skilled in the art without departing from the spirit of my invention, and, hence, I do not wish to be restricted to the specific form shown or uses mentioned, except to the extent indicated in the appended claims.

I claim:
1. A coupling for connecting the adjacent ends of pipes, comprising:
 (a) a collar of semi-rigid material having an inner circumferentially extending radial flange between its ends adapted to extend between the adjacent ends of pipes inserted into the opposite ends of the collar;
 (b) means for securing said flange to at least one of the inserted pipe ends, including openings in said flange adapted to receive a bonding anchoring medium;
 (c) a sleeve of relatively flexible material surrounding said collar and having projecting end portions respectively extending beyond the ends of the collar; and
 (d) means for securing each of said projecting end portions in sealing engagement with the underlying pipe end surface.

2. A coupling for connecting the adjacent ends of pipes, comprising:
 (a) a collar of semi-rigid material having an inner circumferentially extending radial flange between its ends adapted to extend between the adjacent ends of pipes inserted into the opposite ends of the collar, said flange having a plurality of openings for registration with a groove in one of the inserted pipe ends;
 (b) a bonding medium extending into said groove and openings to secure the flange to the grooved pipe end;
 (c) a sleeve of relatively flexible material surrounding said collar and having end portions overlying the ends of said collar; and
 (d) means for clampingly securing the sleeve end portions.

3. In a coupling for connecting the adjacent ends of pipes, a collar structure, comprising:
 (a) a tubular body of semi-rigid material;
 (b) an inner circumferentially extending integral radial flange between the body ends having a plurality of spaced openings therein, said openings being outwardly spaced from the inner edge of said flange and being adapted to receive a bonding anchoring medium for securing the tubular body to at least one pipe; and
 (c) integral inwardly projecting spacing projections at each end of the tubular body for engaging the outer surface of a pipe end when inserted into an end of the tubular body.

4. A pipe section construction having preassembled means at one end providing a coupling for the endwise reception of an end of a pipe section to be coupled thereto, comprising:
 (a) a pipe section having a straight end of uniform diameter;
 (b) a tubular body of semi-rigid material having one end portion in slip fit engagement over the straight end of said pipe section inserted therein, and with the other end of the tubular body being adapted to receive an end of another pipe section to be connected therewith;
 (c) an inner circumferentially extending integral radial flange between the body ends having a plurality of spaced openings therein, said flange having abutting engagement with the end edge surface of the associated pipe section end; and
 (d) means for fixedly securing the tubular body to the associated pipe section end, including a bonding medium between said end edge surface of the associated pipe section and said flange, said bonding medium extending into said openings so as to provide an interlocking connection with the flange.

References Cited

UNITED STATES PATENTS

| 2,116,165 | 5/1938 | Ullman | 285—419 X |
| 3,212,799 | 10/1965 | Rice | 285—235 |
| 3,233,922 | 2/1966 | Evans | 285—369 X |

FOREIGN PATENTS

| 236,127 | 7/1925 | Great Britain. |
| 465,115 | 4/1935 | Great Britain. |
| 765,005 | 4/1934 | France. |

EDWARD C. ALLEN, *Primary Examiner.*

THOMAS F. CALLAGHAN, *Assistant Examiner.*